April 3, 1951 A. S. KING 2,547,327
COMBINED INTERNAL-COMBUSTION ENGINE AND SUPERCHARGER
Filed April 22, 1946 2 Sheets-Sheet 1
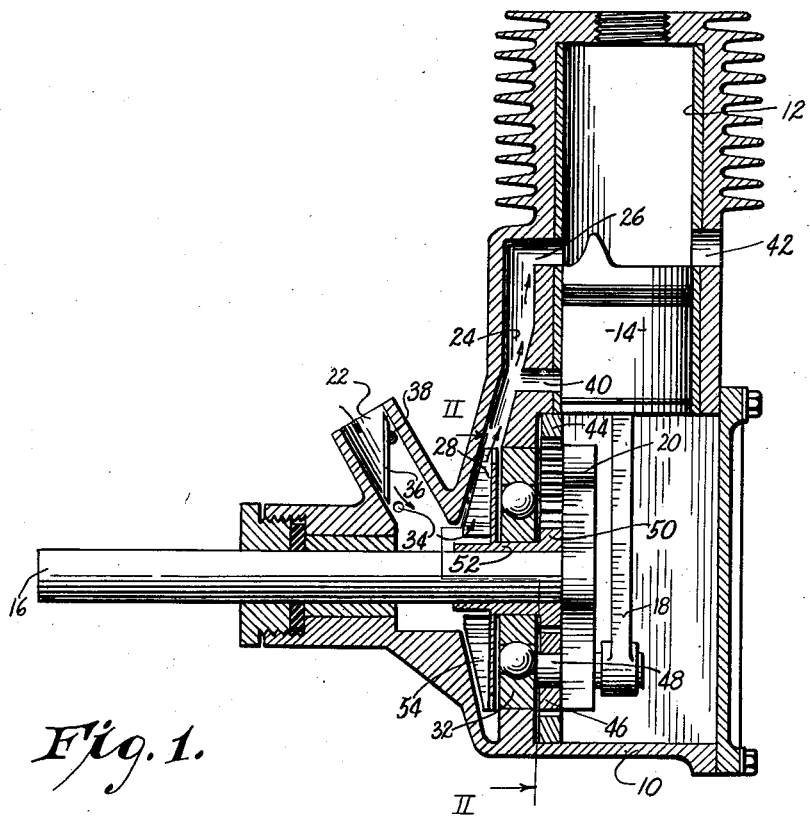
Fig. 1.
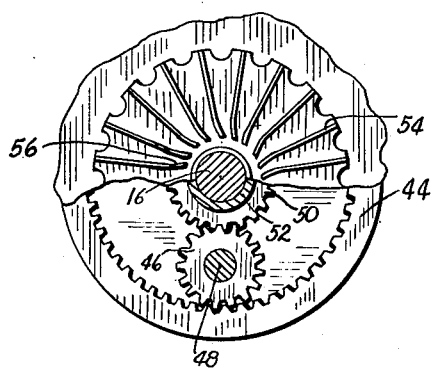
Fig. 2.
INVENTOR.
Arthur S. King
BY 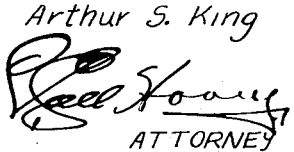
ATTORNEY April 3, 1951          A. S. KING          2,547,327
COMBINED INTERNAL-COMBUSTION ENGINE AND SUPERCHARGER
Filed April 22, 1946          2 Sheets-Sheet 2
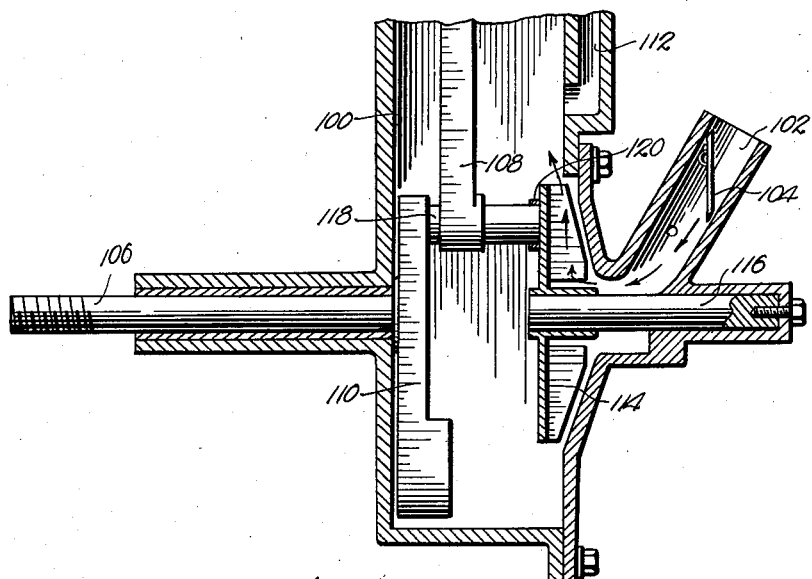
Fig. 3.
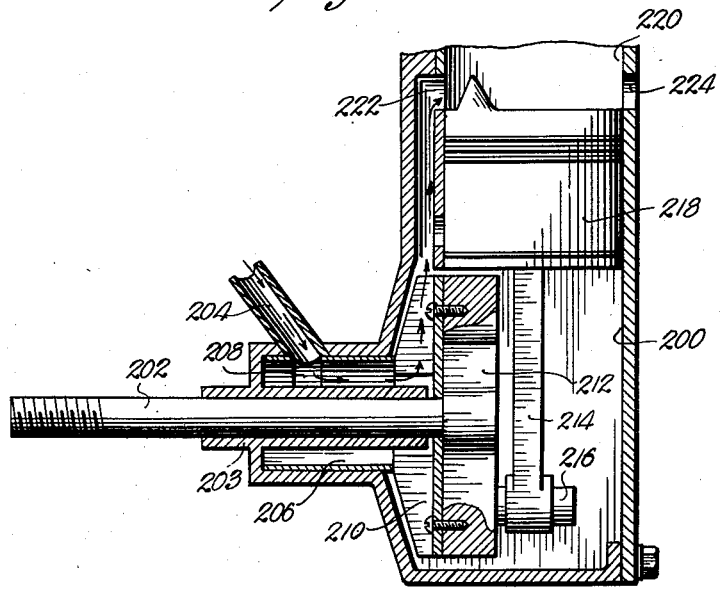
Fig. 4.
INVENTOR.
Arthur S. King
BY
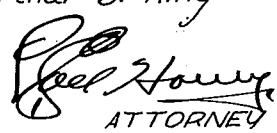
ATTORNEY Patented Apr. 3, 1951

2,547,327

UNITED STATES PATENT OFFICE 2,547,327

COMBINED INTERNAL-COMBUSTION ENGINE AND SUPERCHARGER

Arthur S. King, Kansas City, Mo.

Application April 22, 1946, Serial No. 663,989

2 Claims. (Cl. 123—65)

This invention relates to internal combustion engines and has for its primary aim to provide a supercharger or pressurizing structure for internal combustion engines that is located in the crank case and operably joined directly to the crank shaft of the engine.

Another important object of this invention is to provide an internal combustion engine with a specially disposed and constructed supercharger for the fuel mixture which supercharger is positioned within the crank case of the engine and directly driven by the crank shaft to serve as means for drawing fuel and air into the engine and for pressurizing the fuel mixture prior to its movement to a point of combustion within the cylinder.

Other objects of the invention are to provide an internal combustion engine with a supercharger housed within the crank case of the engine; to provide structure for controlling the entrance of air into the engine via a port adjacent to the supercharger; and to provide means for gearing the supercharger impeller to the conventional parts of the engine for the purpose of driving the impeller at a desired speed in excess to the speed of rotation of the crank shaft.

Other aims of the invention will appear during the course of the following specification referring to the accompanying drawings, wherein:

Fig. 1 is a sectional view through an internal combustion engine having a supercharger assembled therewith in accordance with the present invention.

Fig. 2 is a sectional view taken along the irregular line II—II of Fig. 1.

Fig. 3 is a fragmentary sectional view through a portion of an internal combustion engine showing a supercharger assembly therein which is made pursuant to a modified form of the invention; and Fig. 4 is a similar sectional view through an internal combustion engine having a supercharger therein constructed in accordance with a further modification of my invention.

It has heretofore been the practice to add superchargers to internal combustion engines by building the supercharger separately and affixing the same to the block of the engine and then providing some suitable drive for the supercharger to the end that pressurized fuel mixtures are directed into the cylinder of the engine for compression and explosion. Small engines of the type conventionally employed in model airplanes for example, cannot have their weight increased by an objectionable amount of structure disposed exteriorly of the engine and, therefore, a supercharger housed within the crank case of the engine block is a desirable feature.

The supercharger and engine arrangement shown in Figs. 1 and 2 embodies my invention in one of its preferred forms. The numeral 10 designates the crank case of the internal combustion engine with which is associated a cylinder 12, a piston 14, a crank shaft 16 and a connecting rod 18. The connecting rod is secured to crank shaft 16 through the medium of a counter-weighted head 20. An air intake port 22 communicates with an impeller 28 and a conduit 24 interconnects an intake port 26 leading into cylinder 12 and that portion of the crank case 10 wherein the impeller 28, is disposed.

This impeller freely rotates about crank shaft 16 and the impeller and crank shaft 28 and 16 respectively, are mounted in a bearing 32, as clearly shown in Fig. 1.

A fuel intake opening 34 communicates with intake port 22 and a flutter valve 36 is pivotally mounted for rotation about pin 38. This flutter valve 36 is so positioned as to open when air is being drawn in through port 22 and to close the port when a pressure is built up within the crank case 10. A port 40 interconnects conduit 24 and cylinder 12 at a point below port 26 and the distance between these two ports 26 and 40 is less than the length of piston 14. Thus, when said piston is in the lowermost position as illustrated in Fig. 1, port 40 is closed and port 26 is entirely open. An exhaust port 42 is also open when piston 14 is at its lowermost point in its reciprocating path of travel. A ring gear 44 mounted within crank case 10 meshes with a pinion 46 and this pinion is rotatably mounted on pin 48 that may extend through head 20 and serve as a common means for interconnecting head 20 with connecting rod 18 and pinion 46. This pinion 46 freely rotates on pin 48 and meshes with gear 50 rigid to one end of the hub 52 of impeller 28. Thus, as crank shaft 16 is rotated by the action of piston 14, impeller 28 will be driven at a speed of rotation appreciably greater than the speed of crank shaft 16. A high speed supercharger or pressurizing instrumentality is thereby built directly into the crank case of the engine and mounted directly upon its crank shaft 16.

Impeller 28 has a series of substantially radial blades 54, the inner ends whereof are spaced from hub 52 and cupped as at 56 to form scoops for the fuel mixture entering the crank case in front of impeller 28. Such pressurized fuel mixture as may be entering cylinder 12 when piston 14 is in the position shown in Fig. 1, will assist in driving exhaust gases through port 42 and when piston 14 returns to the outer end of cylinder 12, impeller 28 will not be retarded nor meet with a back pressure because port 40 interconnects the lower portion of cylinder 12 and crank case 10 to receive the pressurized fuel mixture when port 26 is closed. A balanced action is thereby established and the supercharger may operate continuously without being affected by back pressure.

In the form of the invention shown in Fig. 3, the engine crank case 100 has an air and fuel intake port 102 with a flutter valve 104 of the same character as above described with respect to the engine shown in Fig. 1. Crank shaft 106 is joined to connecting rod 108 by head 110 and a passage 112 is formed in the engine block to convey the pressurized fuel mixture to a point above the piston, not here shown, when the said piston is at the lowermost end of its path of travel.

Impeller 114 is mounted upon a shaft 116 and is driven directly by a pin 118 that interconnects head 110 and connecting rod 108, and extends a distance beyond connecting rod 108 to have its end journalled in a socket or suitable bearing 120 in impeller 114. Thus, in this form of the invention, impeller 114 will constantly rotate at the same rate of speed as the speed of rotation of crank shaft 106. Impeller 114 is formed in substantially the same way as is impeller 28, as shown in Figs. 1 and 2.

In the form of the invention shown in Fig. 4 crank case 200 has a crank shaft 202 mounted within a bearing 203, an intake port 204, and a valve 206 rotatably mounted upon bearing 203. Impeller 210 is mounted directly on crank shaft 202 by being attached to head 212 to which connecting rod 214 is joined by pin 216.

Valve 206 is cylindrical and attached directly to impeller 210 for rotation therewith. A circumferential groove 208 provided in valve 206 registers with intake port 204 during a part of the time when valve 206 is rotating upon bearing 203. Piston 218 reciprocates in cylinder 220 and a passage 222 supplies fuel mixture to cylinder 220 in precisely the same manner as set forth with respect to the form of the invention shown in Fig. 1.

An exhaust port 224 evacuates cylinder 220 when piston 218 is in the position shown in Fig. 4. In this instance, the speed of rotation of impeller 210 is the same as the speed of rotation of crank shaft 212.

In all forms of my invention illustrated in Figs. 1, 3, and 4, the intake ports 22, 102 and 204 respectively, are disposed in such manner as to direct the fuel mixture into the crank case at the axis of rotation of the impeller. The rapid speed of rotation of the impeller will force the mixture radially outwardly along the vanes of the impeller and thus pressurize the mixture within the crank case by centrifugal force. This mixture will thence pass into the cylinder under constant pressure built up through the action of the impeller.

Having thus described the invention, what I claim as new and desire to secure by Letters Patent is:

1. In an internal combustion engine having a housing provided with a crankcase, a crank shaft, and a piston in the cylinder operably connected to the crank shaft; a rotatable impeller in the crankcase; means for directing fuel and air mixture to the impeller at the axis of rotation of said impeller; a conduit formed in one of the walls of said housing and disposed to direct said mixture from the periphery of said impeller to the cylinder on one side of the piston when the latter is at one end of its path of travel; and means for redirecting said mixture into the housing at the opposite side of the piston when the latter is at the opposite end of its path of travel.

2. In an internal combustion engine having a crank case, a crank shaft, a cylinder, and a piston in the cylinder connected to the crank shaft, an impeller rotatably mounted in the crank case; structure interconnecting the crank shaft and said impeller for rotating the latter as the engine is operating; a fuel mixture intake port in the crank case adjacent to the axis of rotation of said impeller, said structure including a train of gears formed for rotating the impeller at a rate of speed greater than the rate of speed of the crank shaft; and a conduit interconnecting the crank case and the cylinder to cause the fuel mixture to move to the cylinder after being pressurized in said crank case by the impeller, said impeller being formed to draw the fuel mixture into the crank case and to pressurize the fuel mixture in the latter by centrifugal force.

ARTHUR S. KING.

REFERENCES CITED

The following references are of record in the file of this patent:

UNITED STATES PATENTS

| Number | Name | Date |
|---|---|---|
| 644,951 | Thornton et al. | Mar. 6, 1900 |
| 963,366 | Gathmann | July 5, 1910 |
| 1,146,545 | Aurand | July 13, 1915 |
| 1,350,260 | Long | Aug. 17, 1920 |
| 1,780,635 | Spencer | Nov. 4, 1930 |
| 1,929,885 | Gosslau | Oct. 10, 1933 |

FOREIGN PATENTS

| Number | Country | Date |
|---|---|---|
| 20,024 | Great Britain | of 1911 |
| 129,726 | Great Britain | of 1919 |
| 459,089 | France | of 1913 |
| 494,602 | France | of 1919 |